United States Patent
Danduka et al.

(10) Patent No.: US 11,641,867 B2
(45) Date of Patent: May 9, 2023

(54) POWDERY FOOD, METHOD FOR MANUFACTURING SAME, AND METHOD FOR PROMOTING MYROSINASE ACTIVITY OF POWDERY FOOD

(71) Applicant: Kagome Co., Ltd., Nagoya (JP)

(72) Inventors: Kohei Danduka, Tochigi (JP); Takuma Higashiura, Tochigi (JP)

(73) Assignee: Kagome Co., Ltd., Nagoya (JP)

( * ) Notice: Subject to any disclaimer, the term of this patent is extended or adjusted under 35 U.S.C. 154(b) by 460 days.

(21) Appl. No.: 16/622,268

(22) PCT Filed: Jun. 19, 2018

(86) PCT No.: PCT/JP2018/023249
§ 371 (c)(1),
(2) Date: Dec. 12, 2019

(87) PCT Pub. No.: WO2018/235805
PCT Pub. Date: Dec. 27, 2018

(65) Prior Publication Data
US 2020/0100532 A1  Apr. 2, 2020

(30) Foreign Application Priority Data
Jun. 21, 2017 (JP) .............................. JP2017-120932

(51) Int. Cl.
*A23L 33/105* (2016.01)
*A23L 29/00* (2016.01)
*A23P 10/40* (2016.01)

(52) U.S. Cl.
CPC ............. *A23L 29/06* (2016.08); *A23L 33/105* (2016.08); *A23P 10/40* (2016.08); *A23V 2002/00* (2013.01)

(58) Field of Classification Search
CPC ............... A61K 2300/00; A61K 36/31; A23V 2002/00; A23V 2200/322; A23V 2250/21; A23V 2200/30; A23L 33/105; A23L 29/06; A23L 27/18; A23L 2/39; A23P 10/40
See application file for complete search history.

(56) References Cited

U.S. PATENT DOCUMENTS

| | | | |
|---|---|---|---|
| 5,686,108 | A | 11/1997 | Pusateri et al. |
| 2012/0213890 | A1 | 8/2012 | Sullivan et al. |
| 2015/0110872 | A1 | 4/2015 | Cornblatt et al. |

FOREIGN PATENT DOCUMENTS

| | | |
|---|---|---|
| CN | 101173265 A | 5/2008 |
| CN | 101332295 A | 12/2008 |
| EP | 2213280 A1 | 8/2010 |
| JP | 09-107894 A | 4/1997 |
| JP | 2004-514456 A | 5/2004 |
| JP | 2015-523366 A | 8/2015 |
| WO | WO 02/45527 A2 | 6/2002 |
| WO | WO 2012/074412 A1 | 6/2012 |
| WO | WO 2014/008353 A2 | 1/2014 |

OTHER PUBLICATIONS

CN 101095493, Zheng, Derwent Abstract, Jan. 8, 2008. (Year: 2008).*
Villarreal-Garcia, Daniel;and Daniel A. Jacobo-Velazquez, Glucosinolates from Broccoli: Nutraceutical Properties and their Purficiation, Journal of Nutraceuticals and Food Science, 2016, Vo. 1, No. 1:5 (Year: 2016).*
Nutritionfacts.org, Mustard Greens, retrieved online Mar. 7, 2022. (Year: 2022).*
Science Daily, https://www.sciencedaily.com/releases/2011/09/110913091559.htm, Sep. 13, 2011 (Year: 2011).*
PCT/JP2018/023249, Sep. 4, 2018, International Search Report.
International Search Report in connection with International Application No. PCT/JP2018/023249 dated Sep. 4, 2018.
Cramer et al., Sulforaphane Absorption and Excretion Following Ingestion of a Semi-Purified Broccoli Powder Rich in Glucoraphanin and Broccoli Sprouts in Healthy Men. Nutrition and Cancer. 2011;63(2):196-201.
Dinkova-Kostova et al., Glucosinolates and isothiocyanates in health and disease. Trends in Molecular Medicine. 2012;18(6):337-47.
Fahey et al., Broccoli sprouts: an exceptionally rich source of inducers of enzymes that protect against chemical carcinogens. Proc Natl Acad Sci U S A. 1997;94(19):10367-72.
Ghawi et al., The potential to intensify sulforaphane formation in cooked broccoli (*Brassica oleracea* var. *italica*) using mustard seeds (*Sinapis alba*). Food Chemistry. 2013;138(2-3):1734-41.
Han et al., Separation and purification of sulforaphane from broccoli by solid phase extraction. International Journal of Molecular Sciences. 2011;12(3):1854-61. doi: 10.3390/ijms12031854.
Kikuchi et al., Sulforaphane-rich broccoli sprout extract improves hepatic abnormalities in male subjects. World Journal of Gastroenterology. 2015;21(43):12457-67.
Office Action for Application No. CN 201880041058.7, dated Mar. 15, 2022 (21 pages).

* cited by examiner

*Primary Examiner* — Hong T Yoo
(74) *Attorney, Agent, or Firm* — Wolf, Greenfield & Sacks, P.C.

(57) ABSTRACT

A powdery food containing at least a micronized first powder having myrosinase activity and a second powder containing a glucosinolate.

7 Claims, No Drawings

POWDERY FOOD, METHOD FOR MANUFACTURING SAME, AND METHOD FOR PROMOTING MYROSINASE ACTIVITY OF POWDERY FOOD

CROSS-REFERENCE TO RELATED APPLICATIONS

This application is a 35 U.S.C. § 371 National Phase filing of International Application No. PCT/JP2018/023249, filed on Jun. 19, 2018, entitled "POWDERY FOOD, METHOD FOR MANUFACTURING SAME, AND METHOD FOR PROMOTING MYROSINASE ACTIVITY OF POWDERY FOOD," which claims priority to and the benefit of Japanese Patent Application No. 2017-120932, filed on Jun. 21, 2017, entitled "POWDERY FOOD, METHOD FOR MANUFACTURING SAME, AND METHOD FOR PROMOTING MYROSINASE ACTIVITY OF POWDERY FOOD." The entire contents of these applications are incorporated herein by reference in their entirety.

TECHNICAL FIELD

The present invention relates to a powdery food, a method for manufacturing the same, and a method for promoting myrosinase activity of powdery food.
Priority is claimed on Japanese Patent Application No. 2017-120932, filed Jun. 21, 2017, the content of which is incorporated herein by reference.

BACKGROUND ART

In recent years, as health consciousness has increased, people have focused their attention upon the functional components of food. The applications of these functional components are broad, and for example, include foods and cosmetics and the like, with examples of the foods including beverages, seasonings and supplements.
One functional component derived from food that is attracting attention is glucosinolate (hereafter sometimes abbreviated as GSL). GSL is contained in plants, and for example, is contained in calciferous vegetables such as broccoli, cabbage and daikon (Japanese white radish). Ingestion of GSL is known to prevent and improve various diseases such as cancer and hepatopathy (see non-Patent Documents 1 and 2). Ingested GSL is converted to isothiocyanate (hereafter sometimes abbreviated as ITC), and ITC functions as the active substance that exhibits the above prevention and improvement effects. The conversion of GSL to ITC is performed by myrosinase. Myrosinase is an enzyme that exists in cruciferous vegetables and in vivo such as in the human bowel.
We humans typically ingest GSL in the form of vegetables and the like. At that time, chewing in the mouth breaks down the structure, enabling the GSL and myrosinase in the vegetables to react, with the ITC that is formed from the GSL then being absorbed into the body. However, in many processed foods, heating during the manufacturing process causes inactivation of the myrosinase. Accordingly, when GSL is ingested in such processed foods, almost no conversion to ITC occurs in the mouth. Further, a similar result occurs when GSL is ingested in the form of supplements or the like that do not require chewing. When GSL is ingested from these types of foods, the conversion to ITC is performed by the myrosinase of the enterobacteria in the body. The problem in this case is that the conversion efficiency is extremely low.

PRIOR ART LITERATURE

Non-Patent Documents

Non-Patent Document 1: Dinkova-Kostova A T and one other, Trends Molecular Medicine, 2012, Vol. 18, pp. 337 to 347.
Non-Patent Document 2: Kikuchi and 7 others, World J. Gastroenterol., 2015, Vol 21, pp. 12457 to 12467.

SUMMARY OF THE INVENTION

Problems to be Solved by the Invention

The task for processed foods containing GSL is to enhance the conversion efficiency from GSL to ITC in foods containing both GSL and myrosinase.

Means for Solving the Problems

In order to address the above issue, the inventors of the present invention conducted intensive investigations, and discovered that by micronizing a powder having myrosinase activity, the conversion of GSL to ITC could be promoted. A powdery food according to the present invention contains a micronized first powder having myrosinase activity and a second powder containing GSL. The mean volume diameter of the micronized first powder is not more than 500 µm. In other words, the myrosinase contained in the micronized first powder promotes the conversion of the GSL contained in the second powder.
A method for manufacturing a powdery food according to the present invention includes at least a blending step. In this step, a micronized first powder having myrosinase activity and a second powder containing GSL are blended. The method also includes micronization. This step yields the micronized first powder. The micronization is performed prior to the blending.
The method promoting myrosinase activity of a powdery food according to the present invention includes at least a blending step. In this step, a micronized first powder having myrosinase activity and a second powder containing GSL are blended. The method also includes micronization. This step yields the micronized first powder. The micronization is performed prior to the blending.

Effects of the Invention

The present invention is able to provide a powdery food containing GSL that exhibits enhanced conversion efficiency to ITC.

EMBODIMENTS FOR CARRYING OUT THE INVENTION

Summary of Powdery Food According to Embodiment of Present Invention

A powdery food according to the present embodiment (hereafter referred to as "the present food") is a powdery food in which at least a micronized first powder and a second powder are blended together. A "powdery food" is a food that is composed of powdered raw materials, and examples include encapsulated supplements, powders that are added to a liquid and dissolved immediately prior to consumption (for example, powdered beverages and powdered soups), and powdery seasonings and the like. Among these, encapsulated supplements for which the flavor is not easily detected are preferred.

The micronized first powder is a powdered raw material, and has myrosinase activity. Details of the micronized first powder are described below. The second powder is a powdered raw material, and contains a glucosinolate. Details of the second powder are described below.

ITC is volatile and therefore unstable, and is lost over time. Accordingly, in the present food, it is not desirable that the GSL is converted to ITC prior to ingestion. In other words, it is not desirable that GSL is converted to ITC within the present food. Being a powdery food inhibits the reaction of GSL and myrosinase. In the case of the present food, it is only inside the body following ingestion, or in the liquid prepared by dissolving the present food immediately prior to ingestion, that the GSL first undergoes reaction with myrosinase to produce ICT.

The present food may also use various additives as appropriate. These additives are the types of substances typically added to food, and examples include sweeteners such as acesulfame potassium, acidifiers such as citric acid, antioxidants such as ascorbic acid, thickeners such as gum arabic, anticaking agents such as calcium stearate, excipients such as starch, seasonings and colorants. Further, the present food may also contain vegetable-derived powders other than the first powder and the second powder.

In other words, in one aspect, a powdery food that represents one embodiment of the present invention contains a micronized first powder having myrosinase activity, a second powder containing a glucosinolate, and other components as desired.

The other components are additives that are permissible for food, or at least one component selected from the group consisting of vegetable-derived powders other than the first powder and the second powder.

The additives that are permissible for food are composed of at least one component selected from the group consisting of sweeteners, acidifiers, antioxidants, thickeners, anticaking agents, excipients, seasonings and colorants.

The blend amount of the other components is preferably from 0 to 70% by weight relative to the total weight of the powdery food.

Micronized First Powder

In the present description, a "first powder" means a powdered raw material having myrosinase activity prior to micronization (namely, a powdered raw material containing myrosinase that has not undergone micronization).

In the present description, a "micronized first powder" means a powdered raw material produced by micronizing the first powder described above, wherein this micronized first powder has myrosinase activity.

Details regarding myrosinase activity are described below. Although there are no particular limitations on the micronized first powder, provided it has myrosinase activity, the micronized first powder preferably contains at least one powder selected from the group consisting of powders derived from cruciferous vegetables and powders derived from the seeds of cruciferous vegetables. This is because cruciferous vegetables contain plentiful myrosinase. The term "powders derived from cruciferous vegetables" refers to powders obtained from cruciferous vegetables themselves or from extracts of cruciferous vegetables. The term "powders derived from the seeds of cruciferous vegetables" refers to powders obtained from the seeds of cruciferous vegetables themselves or from extracts of the seeds of cruciferous vegetables.

A "cruciferous vegetable" is a vegetable that falls within the Cruciferae family. Examples include yellow mustard, cabbage, broccoli, kale, watercress, komatsuna (Japanese mustard spinach), bok choy, daikon (white radish) sprouts, cauliflower, Chinese cabbage, brassica flowers, Chinese mustard and kohlrabi, with yellow mustard being particularly preferred. Either one or a plurality of these vegetables may be used. Further, all portions (flowers, leaves and stalks) or only some of the portions of these vegetables may be used.

In one aspect, the micronized first powder in a powdery food that represents one embodiment of the present invention is a powder composed solely of at least one powder selected from the group consisting of powders derived from cruciferous vegetables and powders derived from the seeds of cruciferous vegetables.

In another aspect, the micronized first powder in a powdery food that represents one embodiment of the present invention contains at least one powder selected from the group consisting of powders derived from cruciferous vegetables and powders derived from the seeds of cruciferous vegetables, and further contains another powder (for example, an additive or the like).

In the micronized first powder, the amount of the at least one powder selected from the group consisting of powders derived from cruciferous vegetables and powders derived from the seeds of cruciferous vegetables is preferably within a range from 10 to 100% by weight relative to the total weight of the micronized first powder.

There are no particular limitations on the technique used for obtaining an extract from the cruciferous vegetables or seeds thereof, provided the technique can be conducted with retention of the myrosinase activity, but because myrosinase is inactivated at high temperatures (50° C. to 70° C.), an extraction technique that performed at low temperature (for example, at least 10° C. but less than 50° C.) is preferably employed. Examples include water extraction at or below ambient temperature (for example, water extraction at 10 to 30° C.) and compression using an oil press. The technique for forming a powder typically involves drying and then crushing. There are no particular limitations on the drying technique, provided the drying can be conducted with retention of the myrosinase activity, but because myrosinase is inactivated at high temperatures, a drying technique that is performed at low temperature (for example, at least −60° C. but less than 50° C.) is preferably employed. Examples include vacuum freeze drying and cold air drying. The crushing technique may be a typically used technique, and examples include methods that use a pin mill or a jet mill or the like.

In aspect, the "at least one powder selected from the group consisting of powders derived from cruciferous vegetables and powders derived from the seeds of cruciferous vegetables" contained in the first powder prior to micronization is a powder obtained by extracting, drying and crushing, at low temperature, at least one material selected from the group consisting of cruciferous vegetables and the seeds of cruciferous vegetables.

In the present description, the term "micronization" means reducing the value of the mean volume diameter of the powder, or selecting a powder having a small mean volume diameter. The indicator targeted by the micronized first powder is a specific mean volume diameter. The mean volume diameter can be measured using a laser diffraction/ scattering particle size distribution measurement apparatus under the conditions described in the examples below. The mean volume diameter of the micronized first powder is preferably greater than 0 μm but not more than 500 μm, more preferably greater than 0 μm but not more than 300 μm, and even more preferably within a range from 50 to 300 μm. By ensuring that the mean volume diameter falls within the above range, the conversion of GSL to ITC by myrosinase is promoted. If the mean volume diameter is greater than 500 μm, then the conversion of GSL to ITC by myrosinase is not promoted, whereas if the mean volume diameter is too small, then scattering of the powder, and adhesion or aggregation caused by moisture absorption tend to occur more readily, leading to loss of the micronized first powder or a deterioration in the processability in the blending step.

In other words, in the present description, the term "micronize" means to select or prepare a powder having a mean volume diameter that is greater than 0 μm but not more than 500 μm, preferably greater than 0 μm but not more than 300 μm, and more preferably within a range from 50 to 300 μm, and this can be achieved, for example, by performing sieving with a mesh described below.

In one aspect, the "micronized first powder" is a powder having a mean volume diameter that is greater than 0 μm but not more than 500 μm, preferably greater than 0 μm but not more than 300 μm, and more preferably within a range from 50 to 300 μm.

Although there are no particular limitations on the micronization technique, sieving using a mesh is preferred. The mesh aperture is preferably greater than 0 μm but not more than 500 μm, more preferably greater than 0 μm but not more than 300 μm, and even more preferably within a range from 50 to 300 μm.

The myrosinase activity of the micronized first powder is preferably at least 25.0 unit/g, and is more preferably 40.0 unit/g or higher. The myrosinase activity of the first powder is promoted by the micronization, and reaches a value of at least 25.0 unit/g.

In the present description, the expression "has myrosinase activity" means that the myrosinase activity is greater than 0 unit/g.

The blend amount of the micronized first powder in the present food varies depending on the form of the present food, and although there are no particular limitations, the blend amount is preferably within a range from 2 to 20% by weight (w/w) relative to the total weight of the powdery food that represents one embodiment of the present invention.

In one aspect, the micronized first powder has a GSL content of less than 60 mg/g, and preferably contains no GSL.

Further, in another aspect, the micronized first powder has, as GSL, a glucoraphanin (hereafter sometimes abbreviated as GR) content of less than 60 mg/g, and preferably contains no GR.

Second Powder

The second powder is a powdered raw material, and contains GSL. The second powder is not particularly limited, provided it contains GSL, but preferably contains at least one powder selected from the group consisting of powders derived from cruciferous vegetables and powders derived from the seeds of cruciferous vegetables. This is because cruciferous vegetables contain plentiful GSL. The term "powders derived from cruciferous vegetables" refers to powders obtained from cruciferous vegetables themselves or from extracts of cruciferous vegetables. The term "powders derived from the seeds of cruciferous vegetables" refers to powders obtained from the seeds of cruciferous vegetables themselves or from extracts of the seeds of cruciferous vegetables.

In one aspect, the second powder in a powdery food that represents one embodiment of the present invention is a powder composed solely of at least one powder selected from the group consisting of powders derived from cruciferous vegetables and powders derived from the seeds of cruciferous vegetables.

In another aspect, the second powder in a powdery food that represents one embodiment of the present invention contains at least one powder selected from the group consisting of powders derived from cruciferous vegetables and powders derived from the seeds of cruciferous vegetables, and further contains another powder (for example, an additive or the like).

In the second powder, the amount of the at least one powder selected, from the group consisting of powders derived from cruciferous vegetables and powders derived from the seeds of cruciferous vegetables is preferably within a range from 10 to 100% by weight relative to the total weight of the second powder.

The cruciferous vegetables are as described above. Among these vegetables, the cruciferous vegetable used in the second powder is preferably broccoli. The broccoli is not restricted to any particular stage of maturity, and sprouts may be used. Either one or a plurality of cruciferous vegetables may be used. Further, all portions (flowers, leaves and stalks) or only some of the portions of these vegetables may be used.

There are no particular limitations on the technique used for obtaining an extract from the cruciferous vegetables or seeds thereof, provided the technique can extract GSL. Because GSL is an extremely stable compound, typically used extraction methods may be employed, and examples include hot water extraction (for example, extraction with hot water of 50 to 100° C.). The technique for forming a powder typically involves drying and then crushing. There are no particular limitations on the drying technique, provided the drying can be conducted with retention of the GSL. Because GSL is an extremely stable compound, typically used drying methods may be employed, and examples include spray drying, drum drying, vacuum freeze drying and cold air drying. The crushing technique may be a typically used technique, and examples include methods that use a pin mill or a jet mill or the like. In order to facilitate efficient powdering, the second powder may also use various additives as appropriate. Examples of these additives include powdered base materials such as dextrin.

In one aspect, the "at least one powder selected from the group consisting of powders derived from cruciferous vegetables and powders derived from the seeds of cruciferous vegetables" contained in the second powder in a powdery food that represents one embodiment of the present invention is a powder obtained by subjecting at least one material selected from the group consisting of cruciferous vegetables and the seeds of cruciferous vegetables to a hot water extraction.

There are no particular limitations on the GSL contained in the second powder, and examples include glucoraphanin (sometimes abbreviated as GR, also known as sulforaphane glucosinolate), sinigrin, glucoalyssin, glucobrassicin, glucoraphenin, glucoraphasatin and phenethyl glucosinolate, but GR is particularly preferred. Either one or a plurality of these GSL compounds may be used.

The GSL content in the second powder is not particularly limited, but is preferably at least 60 mg/g but not more than 1,000 mg/g, and more preferably at least 120 mg/g but not more than 1,000 mg/g. Further in another aspect, as the GSL content, the GR content is preferably at least 60 mg/g but not more than 1,000 mg/g, and more preferably at least 120 mg/g but not more than 1,000 mg/g.

The second powder may or may not have myrosinase activity. Because the second powder is required to contain GSL, it is undesirable that this GSL is converted to ITC during the manufacturing process (for example, during extraction). Accordingly, in the case of the second powder, it is preferable that myrosinase is inactivated during the manufacturing process, so that as a result, the second powder preferably has no myrosinase activity. The expression "has no myrosinase activity" means that, in a measurement of the myrosinase activity described below, the myrosinase activity is 0 unit/g.

In one aspect, the second powder in a powdery food that represents one embodiment of the present invention is a powder having a myrosinase activity of less than 25.0 unit/g, and preferably less than 10 unit/g.

In another aspect, the second powder in a powdery food that represents one embodiment of the present invention is a powder having no myrosinase activity (a myrosinase activity of 0 unit/g).

Further, the mean volume diameter of the second powder in the powdery food that represents one embodiment of the present invention is preferably within a range from 20 to 1,000 μm.

The blend amount of the second powder in the present food varies depending on the form of the present food, and although there are no particular limitations, the blend amount of the second powder is preferably within a range from 25 to 97% by weight (w/w) relative to the total weight of the powdery food that represents one embodiment of the present invention.

However, the total of the blend amount of the first powder, the blend amount of the second powder, and the blend amount of any other components described above does not exceed 100% by weight (w/w).

Myrosinase Activity

The expression "myrosinase activity" refers to the enzyme activity (potency) that converts GSL to ITC. The myrosinase activity (unit/g) is determined by reacting myrosinase and the GSL base material, measuring the GSL content and the ITC content at regular intervals, and then calculating the myrosinase activity based on the changes in these content values.

Measurement of the GSL content and the ITC content may be conducted using methods known to those skilled in the art. For example, HPLC (High Performance Liquid Chromatography) methods may be used, and specifically, measurement of GSL may be conducted in accordance with a method disclosed by Fahey et al. (Fahey et al., Proc. Natl. Acad. Sci. USA, 94, 10367 to 10372, 1997) or the like, whereas measurement of ITC may be conducted in accordance with a method disclosed by Han et al. (Han et al., Int. J. Mol. Sci., 12, 1854 to 1861, 2011) or the like.

A powdery food that represents one embodiment of the present invention is, for example, preferably consumed once a day in an amount that provides about 30 mg of a glucosinolate.

Method for Manufacturing Powdery Food According to Embodiment of the Present Invention A method for manufacturing a powdery food according to an embodiment of the present invention (hereafter referred to as the "present manufacturing method") includes at least a blending step. In this blending step, a micronized first powder having myrosinase activity and a second powder containing a glucosinolate are blended. There are no particular limitations on the blending technique, provided the micronized first powder and the second powder can be mixed uniformly.

The micronized first powder has a an volume diameter that is greater than 0 μm but not more than 500 μm preferably greater than 0 μm but not more than 300 μm, and more preferably within a range from 50 to 300 μm, and may be either a powder that is micronized using the micronization step described below so that the mean volume diameter falls within the above numerical range, or may be a commercially available powder that has a mean volume diameter that falls within the above numerical range.

In the blending step described above, blending is preferably performed so that, relative to the total weight of the obtained powdery food, the amount of the micronized first powder having myrosinase activity is within a range from 2 to 20% by weight, and the amount of the second powder is within a range from 25 to 97% by weight.

The present manufacturing method also includes a micronization step. The micronization step is performed on the first powder prior to blending, and results in the preparation of the micronized first powder. The technique used for the micronization is as described above.

In other words, in one aspect, the method for manufacturing a powdery food that represents one embodiment of the present invention includes:

a step of blending the micronized first powder having myrosinase activity, and the second powder containing a glucosinolate.

Moreover, the manufacturing method may also include, prior to the blending step described above, a step of micronizing a raw material containing myrosinase to obtain the micronized first powder, and the micronization may be performed by sieving using a mesh with an aperture that is greater than 0 μm but not more than 500 μm, preferably greater than 0 μm but not more than 300 μm, and more preferably within a range from 50 to 300 μm.

The raw material containing myrosinase may be a raw material containing at least one component selected from the group consisting of components derived from cruciferous vegetables and components derived from the seeds of cruciferous vegetables, wherein the components derived from cruciferous vegetables may be the cruciferous vegetables themselves, or may be extracts obtained from the cruciferous vegetables, and these components may be subjected to further drying and/or crushing.

The components derived from the seeds of cruciferous vegetables may be the seeds of the cruciferous vegetables themselves, or may be extracts obtained from the seeds of the cruciferous vegetables, and preferably low-temperature extracts, and these components may be subjected to further drying, or drying and crushing.

The above manufacturing method may include, prior to the blending step described above, at least a step of subjecting a raw material containing a cruciferous vegetable and the seeds of a cruciferous vegetable to hot water extraction, and then drying and crushing the extract to obtain the second powder described above.

In another aspect, the method for manufacturing a powdery food that represents one embodiment of the present invention includes:

a step of subjecting a material containing at least a cruciferous vegetable and the seeds of a cruciferous vegetable to an extraction at low temperature, and then drying and crushing the extract to obtain a first powder, a step of micronizing the first powder to obtain a micronized first powder having myrosinase activity, a step of subjecting a raw material containing at least a cruciferous vegetable and the seeds of a cruciferous vegetable to hot water extraction, and then drying and crushing the extract to obtain a second powder containing a glucosinolate, and a step of blending the micronized first powder having myrosinase activity, and the second powder containing a glucosinolate.

Method for Promoting Myrosinase Activity of Powdery Food According to Embodiment of the Present Invention A method for promoting the myrosinase activity of a powdery food according to an embodiment of the present invention (hereafter referred to as the "present method") includes at least a blending step. In the blending step, a micronized first powder and a second powder are blended. There are no particular limitations on the blending technique, provided the micronized first powder and the second powder can be mixed uniformly.

The present method also includes a micronization step. The micronization step is performed on the first powder prior to blending, and results in the preparation of the micronized first powder. The technique used for the micronization is as described above.

In other words, in one aspect, the method for promoting the myrosinase activity of a powdery food that represents one embodiment of the present invention includes:

a step of blending the micronized first powder having myrosinase activity, and the second powder containing a glucosinolate.

Moreover, the method may also include, prior to the blending step described above, a step of micronizing a raw material containing myrosinase to obtain the micronized first powder, and the micronization may be performed by sieving using a mesh with an aperture that is greater than 0 μm but not more than 500 μm, preferably greater than 0 μm but not more than 300 μm, and more preferably within a range from 50 to 300 μm.

The raw material containing myrosinase may be a raw material containing at least one component selected from the group consisting of components derived from cruciferous vegetables and components derived from the seeds of cruciferous vegetables, wherein the components derived from cruciferous vegetables may be the cruciferous vegetables themselves, or may be extracts obtained from the cruciferous vegetables, and these components may be subjected to further drying and/or crushing.

The components derived from the seeds of cruciferous vegetables may be the seeds of the cruciferous vegetables themselves, or may be extracts obtained from the seeds of the cruciferous vegetables, and preferably low-temperature extracts, and these components may be subjected to further drying, or drying and crushing.

The above method may include, prior to the blending step described above, at least a step of subjecting a raw material containing a cruciferous vegetable and the seeds of a cruciferous vegetable to hot water extraction, and then drying and crushing the extract to obtain the second powder described above.

In another aspect, the method for promoting the myrosinase activity of a powdery food that represents one embodiment of the present invention includes:

a step of subjecting a material containing at least a cruciferous vegetable and the seeds of a cruciferous vegetable to an extraction at low temperature, and then drying and crushing the extract to obtain a first powder, a step of micronizing the first powder to obtain a micronized first powder having myrosinase activity, a step of subjecting a raw material containing at least a cruciferous vegetable and the seeds of a cruciferous vegetable to hot water extraction, and then drying and crushing the extract to obtain a second powder containing a glucosinolate, and a step of blending the micronized first powder having myrosinase activity, and the second powder containing a glucosinolate.

The expression "promoting myrosinase activity" indicates an enhancement of the myrosinase activity of the micronized first powder compared with the myrosinase activity of the first powder prior to micronization (the non-micronized first powder). As a result of promoting the myrosinase activity, the myrosinase activity of the micronized first powder is preferably at least 25.0 unit/g, and more preferably 40.0 unit/g or higher.

In another aspect, the expression "promoting myrosinase activity" means increasing myrosinase activity that was less than 25.0 unit/g prior to micronization to a value of 25.0 unit/g or greater by performing micronization.

In one aspect, the powdery food that represents one embodiment of the present invention includes:

at least micronized first powder having myrosinase activity, and a second powder containing a glucosinolate; wherein the micronized first powder contains at least one powder selected from the group consisting of powders derived from cruciferous vegetables and powders derived from the seeds of cruciferous vegetables, and is preferably a powder composed of at least one component selected from the group consisting of powders derived from cruciferous vegetables and powders derived from the seeds of cruciferous vegetables;

the cruciferous vegetables include yellow mustard, cabbage, broccoli, kale, watercress, komatsuna (Japanese mustard spinach), bok choy, daikon (white radish) sprouts, cauliflower, Chinese cabbage, brassica flowers, Chinese mustard and kohlrabi, with yellow mustard being preferred;

the mean volume diameter of the micronized first powder is at least 22 μm but not more than 500 μm, and preferably within a range from 50 to 300 μm;

the myrosinase activity of the micronized first powder is at least 25.0 unit/g, and preferably 40.0 unit/g or higher;

the second powder contains at least one powder selected from the group consisting of powders derived from cruciferous vegetables and powders derived from the seeds of cruciferous vegetables, and is preferably a powder composed of at least one component selected from the group consisting of powders derived from cruciferous vegetables and powders derived from the seeds of cruciferous vegetables;

the cruciferous vegetables include yellow mustard, cabbage, broccoli, kale, watercress, komatsuna (Japanese mustard spinach), bok choy, daikon (white radish) sprouts, cauliflower, Chinese cabbage, brassica flowers, Chinese mustard and kohlrabi, with broccoli being preferred;

the glucosinolate content in the second powder is at least 60 mg/g but not more than 1,000 mg/g, and preferably at least 120 mg/g but not more than 1,000 mg/g;

the glucosinolate is glucoraphanin;

the second powder has a myrosinase activity of less a 25.0 unit/g, and preferably less than 10 unit/g, or has no myrosinase activity;

the blend amount of the first powder is within a range from 2 to 20% by weight relative to the total weight of the powdery food, and the blend amount of the second powder is preferably within a range from 25 to 97% by weight relative to the total weight of the powdery food, provided that the total of the blend amounts of the first powder and the second powder does not exceed 100% by weight.

The at least one powder selected from the group consisting of powders derived from cruciferous vegetables and powders derived from the seeds of cruciferous vegetables that is contained within the above micronized first powder may be a powder obtained by extracting, at low temperature, at least one material selected from the group consisting of cruciferous vegetables and the seeds of cruciferous vegetables; and the at least one powder selected from the group consisting of powders derived from cruciferous vegetables and powders derived from the seeds of cruciferous vegetables that is contained within the above second powder may be a powder obtained by hot water extraction of at least one material selected from the group consisting of cruciferous vegetables and the seeds of cruciferous vegetables.

Moreover, the micronized first powder may have a GSL content of less than 60 mg/g, or may contain no GSL.

The micronized first powder may have a GR content of less than 60 mg/g, or may contain no GR.

In one aspect, the method for manufacturing a powdery food that represents one embodiment of the present invention includes:

a step of subjecting a material containing at least a cruciferous vegetable and the seeds of a cruciferous vegetable to an extraction at low temperature, and then drying and crushing the extract to obtain a first powder, a step of micronizing the first powder to obtain a micronized first powder having myrosinase activity, a step of subjecting a material containing at least a cruciferous vegetable and the seeds of a cruciferous vegetable to hot water extraction, and then drying and crushing the extract to obtain a second powder containing a glucosinolate, and a step of blending the micronized first powder having myrosinase activity, and the second powder containing a glucosinolate; wherein the cruciferous vegetables in the first powder include yellow mustard, cabbage, broccoli, kale, watercress, komatsuna (Japanese mustard spinach), bok choy, daikon (white radish) sprouts, cauliflower, Chinese cabbage, brassica flowers, Chinese mustard and kohlrabi, with yellow mustard being preferred;

the micronization is performed by sieving using a mesh with an aperture that is greater than 0 μm but not more than 500 μm, preferably greater than 0 μm but not more than 300 μm, and more preferably within a range from 50 to 300 μm;

the micronization is micronization that achieves a mean volume diameter of the first powder that is at least 22 μm but not more than 500 μm, and preferably within a range from 50 to 300 μm;

the micronization is micronization that achieves a myrosinase activity of the first powder that is at least 25.0 unit/g, and preferably 40.0 unit/g or higher;

the cruciferous vegetables in the second powder include yellow mustard, cabbage, broccoli, kale, watercress, komatsuna (Japanese mustard spinach), bok choy, daikon (white radish) sprouts, cauliflower, Chinese cabbage, brassica flowers, Chinese mustard and kohlrabi, with broccoli being preferred;

the glucosinolate content in the second powder is at least 60 mg/g but not more than 1,000 mg/g, and preferably at least 120 mg/g but not more than 1,000 mg g;

the glucosinolate is glucoraphanin;

the second powder has a myrosinase activity of less than 25.0 unit/g, or has no myrosinase activity; and the blending is performed so that, relative to the total weight of the powdery food, the blend amount of the first powder is within a range from 2 to 20% by weight and the blend amount of the second powder is within a range from 25 to 97% by weight, provided that the total of the blend amounts of the first powder and the second powder does not exceed 100% by weight.

EXAMPLES

The present invention is described below in further detail using a series of examples, but the present invention is not limited to the following examples. In the examples, the myrosinase activity was evaluated by targeting GR among the GSL, and determining the amount of sulforaphane (SFN) known as the ITC converted from GR by the myrosinase.

First Powder

Yellow mustard seeds were used as the raw material. The yellow mustard seeds were compressed in an oil press to obtain a pressed oil cake. The cake was dried inside a desiccator at normal temperature (20° C.) to obtain a sample (first powder) prior to micronization.

Micronization

Micronization was performed by sieving. The above cake obtained from the yellow mustard seeds was crushed in a pin mill, and the resulting powder was sieved through sieves of different apertures, thus obtaining a series of first powders having different mean volume diameters. The apertures of the sieves used in the sieving were 25 μm, 53 μm, 100 μm, 300 μm, 500 μm, 710 μm and 850 μm.

Measurement of the GR content and the SFN content of each of the above first powders by an HPLC method revealed that each of the first powders contained neither GR nor SFN. The methods used for measuring the CR content and SFN content are described below.

Mean Volume Diameter

Measurement of the mean volume diameter of each of the first powders was conducted using a laser diffraction/scattering particle size distribution measurement apparatus (Microtrac MT3300EX, manufactured by MicrotracBEL Corporation). The analysis conditions included using distilled water as the solvent, settling the solvent refractive index to "1.333", setting the transmittance property to "transmittance", setting the particle retractive index to "1.81", and setting the shape to "aspherical".

Second Powder

Broccoli sprouts were used as the raw material. Broccoli seeds (from Caudill Seed Co., Inc.) were allowed to germinate, and were cultivated for one day after germination to obtain broccoli sprouts. These sprouts ware extracted in 95° C. hot water for 30 minutes, and the residue of the broccoli sprouts was then removed to obtain an extract liquid. The extract liquid was concentrated using a rotary evaporator, subsequently mixed with dextrin, and then spray dried to obtain a second powder. Measurement of the GR content in the second powder by an HPLC method yielded a result of 145 mg/g. Measurement of the SFN content in the second powder by an HPLC method revealed that the second powder contained no SFN. Furthermore, because the second powder had been subjected to an extraction in hot water, it had no myrosinase activity.

GR Content

Measurement of the GR content was performed by an HPLC method under the conditions described below.
Apparatus: ACQUITY UPLC H-Class system (manufactured by Waters Corporation)
Column: ACQUITY CSH C18 (ø2.1×100 mm, 1.7 μm) (manufactured by Waters Corporation)
Column temperature : 30° C.
Sample injection volume: 10 μL
Mobile phase A: ultrapure water:trifluoroacetic acid=99.95:0.05 (v:v)
Mobile phase B: methanol:trifluoroacetic acid 99.95:0.05 (v:v)
Gradient: mobile phase B proportion held at 0% for 5 minutes
  linear gradient changing mobile phase B proportion 0→10% over 10 minutes
  linear gradient changing mobile phase B proportion 10→100% over 5 minutes
  mobile phase B proportion held at 100% for 5 minutes
  linear gradient changing mobile phase B proportion 100→0% over 2 minutes
  mobile phase B proportion held at 0% for 5 minutes
Flow rate: 0.1 mL/min
Detection wavelength: 235 nm
The GR content was calculated from the GR concentration in the sample obtained by HPLC analysis and the amount of the sample supplied to the extraction process.

SFN Content

Measurement of the SFN content was performed by an HPLC method under the conditions described below.
Apparatus: ACQUITY UPLC H-Class system (manufactured by Waters Corporation)
Column: ACQUITY BEH C18 (ø2.1×50 mm, 1.7 μm) (manufactured by Waters Corporation)
Column temperature: 35° C.
Sample injection volume: 10 μL
Mobile phase: ultrapure water:acetonitrile=80:20 (v:v)
Flow rate: 0.2 mL/min
Detection wavelength: 202 nm The SFN content was calculated from the SFN concentration in the sample obtained by HPLC analysis and the amount of the sample supplied to the extraction process.

Myrosinase Activity

The myrosinase activity (unit/g) of each first powder was evaluated by measuring the SFN content converted from GR by reaction with myrosinase. Specifically, the myrosinase activity was calculated from the following formula.

[Numerical Formula 1]

$$[\text{Myrosinase activity (unit/g)}] = \frac{d\left(\frac{dn_P}{dt}\right)}{dm_E}$$

($n_P$: SFN content [μmol] $t$: time [min]
$m_E$: amount of first powder [g] unit = μmol/min)

The myrosinase reaction performed by mixing the first powder and the second powder was performed in the following manner. Samples of 2.5 mg, 5.0 mg and 10.0 mg of the first powder of each mean volume diameter were prepared in 50 mL tubes. The second powder was dissolved in a 33 mM phosphate buffer solution (pH 7.0) to achieve a GR content of 2.0 mg/ml, and was then held at 37° C. in a water bath (second powder solution). Next, 5 mL of the second powder solution was added to each 50 mL tube containing a first powder, and following thorough mixing, the tube was placed in a water bath at 37° C. to start the myrosinase reaction. Ten minutes, 20 minutes and 30 minutes after the start of the reaction, a 100 μL sample was removed from the reaction liquid, mixed with 20 μL of a 20% trifluoroacetic acid solution, and then stored on ice. Following collection of all of the reaction liquids, 0.4 mL of ethyl acetate was added to each sample and mixed thoroughly. Each of the obtained liquids was subjected to centrifugal separation (1000×g, 4° C., 5 minutes), and 200 μL of the collected supernatant was dried and solidified in a centrifugal separator (40° C., 20 minutes). Next, 250 μL of ultrapure water was added, and an ultrasound treatment was used to redissolve the dried solid material. A centrifugal separation was conducted, and the collected supernatant was used as the HPLC sample for measuring the SFN content.

The evaluation results are as shown in Table 1. The results in Table 1 represent the mean volume diameter and the myrosinase activity each of the first powders obtained by the treatment with sieves of different apertures. As shown in Table 1, compared with the first powder having the largest mean volume diameter, which was sieved using the sieve with an aperture of 850 μm, the myrosinase activity in the case of the first powder that was sieved using the sieve with an aperture of 500 μm was approximately twice as large. The mean volume diameter of the first powder in this case was about 500 μm. Moreover, as the aperture size was reduced, the mean volume diameter of the first powder decreased, and the myrosinase activity increased. On the other hand, the myrosinase activity in the case of the first powder having a mean volume diameter of about 600 μm, which was obtained using the sieve with an aperture of 710 μm, was almost unchanged from that of the first powder obtained using the sieve with an aperture of 850 μm.

TABLE 1

| Aperture (μm) | Mean volume diameter (μm) | Myrosinase activity (unit/g) |
|---|---|---|
| 850 | 747 | 13.7 |
| 710 | 597 | 9.3 |
| 500 | 499 | 26.3 |
| 300 | 309 | 39.0 |
| 100 | 113 | 50.3 |
| 53 | 51 | 60.1 |
| 25 | 22 | 96.4 |

In those cases where a first powder having a mean volume diameter of not more than 500 μm (namely, a micronized first powder) was used, the myrosinase activity was promoted, and the conversion of GR to SFN was able to be enhanced. In other words, this indicated that when a micronized first powder was used, conversion to ITC was able to be enhanced. Accordingly, a powdery food containing a micronized first powder and a second powder containing GSL is a powdery food that exhibits enhanced conversion to ITC.

INDUSTRIAL APPLICABILITY

The present invention is able to provide a powdery food containing GSL that exhibits enhanced conversion efficiency to ITC, a method for manufacturing the powdery food, and a method for promoting the myrosinase activity of a powdery food containing GSL, and is therefore extremely important industrially.

The invention claimed is:

1. A powdery food comprising at least a micronized first powder having myrosinase activity and a second powder containing a glucosinolate,
   wherein a mean volume diameter of the first powder is not more than 500 μm, and
   wherein the second powder has no myrosinase activity.

2. The powdery food according to claim 1, wherein a mean volume diameter of the first powder is from 50 to 300 μm.

3. The powdery food according to claim 1, wherein the first powder contains at least one powder selected from the group consisting of powders derived from cruciferous vegetables and powders derived from seeds of cruciferous vegetables.

4. The powdery food according to claim 3, wherein the cruciferous vegetable is mustard.

5. The powdery food according to claim 1, wherein the second powder contains at least one powder selected from the group consisting of powders derived from cruciferous vegetables and powders derived from seeds of cruciferous vegetables.

6. The powdery food according to claim 5, wherein the cruciferous vegetable is broccoli.

7. The powdery food according to claim 1, wherein the glucosinolate is glucoraphanin.

* * * * *